US012630155B2

(12) United States Patent
 Xiao et al.

(10) Patent No.: US 12,630,155 B2
(45) Date of Patent: May 19, 2026

(54) OBJECT AVOIDANCE COMMUNICATION SYSTEM FOR VEHICLES

(71) Applicant: Valeo Schalter und Sensoren GmbH, Bietigheim-Bissingen (DE)

(72) Inventors: Xinhua Xiao, San Mateo, CA (US); Peter Groth, San Mateo, CA (US)

(73) Assignee: Valeo Schalter und Sensoren GmbH (DE)

( * ) Notice: Subject to any disclaimer, the term of this patent is extended or adjusted under 35 U.S.C. 154(b) by 205 days.

(21) Appl. No.: 18/206,681

(22) Filed: Jun. 7, 2023

(65) Prior Publication Data

US 2024/0409089 A1      Dec. 12, 2024

(51) Int. Cl.
 *B60W 30/095* (2012.01)
 *B60W 30/085* (2012.01)
 *G06V 20/58* (2022.01)

(52) U.S. Cl.
 CPC ........ *B60W 30/095* (2013.01); *B60W 30/085* (2013.01); *G06V 20/58* (2022.01); *B60W 2420/403* (2013.01); *B60W 2554/4049* (2020.02)

(58) Field of Classification Search
 CPC ............. B60W 30/095; B60W 30/085; B60W 2420/403; B60W 2554/4049; G06V 20/58; G06V 10/82
 See application file for complete search history.

(56) References Cited

U.S. PATENT DOCUMENTS

| | | | |
|---|---|---|---|
| 8,260,496 B2 | 9/2012 | Gagliano | |
| 12,409,859 B1 * | 9/2025 | Burlina | ................ G06V 10/143 |
| 2016/0357188 A1 * | 12/2016 | Ansari | ................. G05D 1/0274 |
| 2018/0276485 A1 * | 9/2018 | Heck | ........................ G06N 7/01 |
| 2019/0072978 A1 | 3/2019 | Levi | |
| 2019/0135283 A1 * | 5/2019 | Bonk | ................. G01C 21/3822 |
| 2020/0201356 A1 * | 6/2020 | Schuh | ................. B60W 30/165 |
| 2021/0089815 A1 * | 3/2021 | Ghannam | ............. B60W 40/06 |
| 2021/0192234 A1 * | 6/2021 | Chen | .................. B60W 60/001 |
| 2022/0114433 A1 * | 4/2022 | Lu | ........................... G06V 10/82 |
| 2022/0203964 A1 | 6/2022 | Ip et al. | |

(Continued)

OTHER PUBLICATIONS

International Search Report and Written Opinion for PCT/US2024/032701, Mail Date of Nov. 25, 2024, 11 Pages.

(Continued)

*Primary Examiner* — Abby Lin
*Assistant Examiner* — Danielle M Jackson
(74) *Attorney, Agent, or Firm* — Dickinson Wright PLLC

(57) ABSTRACT

Methods and systems for assisting a vehicle in avoiding an object in a roadway and communicating associated information to trailing vehicles. Image data is sensed by a vehicle image sensor regarding a roadway. A computing system detects an object in the roadway based on the first image data. Feature extraction is performed to extract relevant features of the object, which is fed to an object classification model to determine a class of the object. A threat analysis is performed based on the determined class of the object, outputting a risk score. The first vehicle is commanded to take an action based on the risk score. The class of the object, the risk score, and/or the commanded action taken by the vehicle is communicated to a second vehicle that is approaching the object.

14 Claims, 5 Drawing Sheets

(56) References Cited

U.S. PATENT DOCUMENTS

| | | | |
|---|---|---|---|
| 2022/0348222 A1* | 11/2022 | Zhao | H04W 4/38 |
| 2024/0035834 A1* | 2/2024 | Beaurepaire | G01C 21/3807 |

OTHER PUBLICATIONS

Kevin Christensen et al. "Towards a Distraction-free Waze." HotMobile Feb. 27-28, 2019, Santa Cruz CA, USA, pp. 15-20.
Tripathi, Nivedita and Yogamani, Senthil, Trained trajectory based Automated Parking System using Visual SLAM on Surround View Cameras, May 19, 2021, 8 pages.

* cited by examiner

400

| | |
|---|---|
| Receive Image Data | ~402 |
| Detect Object | ~404 |
| Extract Features | ~406 |
| Determine Class Based On Image Data And Extracted Features | ~408 |
| Perform Threat Analysis | ~410 |
| Command Vehicle Action Based On Threat Analysis Risk Score | ~412 |
| Communicate Class, Risk Score, And/Or Commanded Action To Second Vehicle | ~414 |

OBJECT AVOIDANCE COMMUNICATION SYSTEM FOR VEHICLES

TECHNICAL FIELD

The present disclosure relates to methods and systems for utilizing image processing and machine learning to determine the presence of an object on a road, controlling the vehicle to avoid the object, and wirelessly transmitting data regarding the determined presence of the object such that vehicles that subsequently travel the same road can safely avoid the object.

BACKGROUND

Modern automotive vehicles are typically equipped with a variety of sensors. Whether internal or external to the passenger cabin of the vehicle, these sensors provide the foundation for driving automation and vehicle autonomy. Vehicles with autonomous or semi-autonomous driving or driver-assistant features use these sensors and associated computer vision technology to safely maneuver the vehicle. For example, vehicles can be equipped with a camera and image processing capabilities that detect potholes in the roadway. This information can help a driver avoid the pothole, or can lead to an automated adjustment of the vehicle itself (e.g., altering the vehicle's suspension in preparation of running over the pothole).

SUMMARY

In an embodiment, an object avoidance communications computing system includes a first image sensor mounted to a first vehicle and configured to generate first image data, and one or more processors programmed to execute instructions stored on memory that cause the one or more processors to perform the following: receiving the first image data, wherein the first image data corresponds to a roadway that the first vehicle is traveling on; utilizing a neural network backbone to detect an object on the roadway based on the first image data and perform feature extraction on the first image data to extract relevant features of the object; executing an object classification model based on the first image data and the relevant features to determine a class of the object; performing a threat analysis based on the determined class of the object to determine a risk score; commanding an action to be taken by the first vehicle, wherein the commanded action varies depending on the risk score; and communicating wirelessly, to a second vehicle on the roadway, at least one of the determined class of the object, the risk score, and the commanded action taken by the first vehicle.

In an embodiment, a method of avoiding an object in a roadway and communicating associated information with other vehicles is provided. The method includes the following: receiving first image data sensed by a first sensor mounted on a first vehicle, wherein the first image data corresponds to a roadway that the first vehicle is traveling on; utilizing a neural network backbone to detect an object on the roadway based on the first image data and perform feature extraction on the first image data to extract relevant features of the object; executing an object classification model based on the first image data and the relevant features to determine a class of the object; performing a threat analysis based on the determined class of the object to determine a risk score; commanding an action to be taken by the first vehicle, wherein the commanded action varies depending on the risk score; and communicating wirelessly, to a second vehicle on the roadway, at least one of the determined class of the object, the risk score, and the commanded action taken by the first vehicle.

In an embodiment, a non-transitory computer-readable storage medium storing one or more programs is provided with instructions which, when executed by one or more processors of an electronic device, cause the electronic device to perform the following: receiving first image data sensed by a first sensor mounted on a first vehicle, wherein the first image data corresponds to a roadway that the first vehicle is traveling on; detecting an object on the roadway based on the first image data; utilizing a neural network to perform feature extraction on the first image data to extract relevant features of the object and execute an object classification model based on the first image data and the relevant features to determine a class of the object; performing a threat analysis based on the determined class of the object to determine a risk score; commanding an action to be taken by the first vehicle, wherein the commanded action varies depending on the risk score; and communicating wirelessly, to a second vehicle on the roadway, at least one of the determined class of the object, the risk score, and the commanded action taken by the first vehicle.

DETAILED DESCRIPTION

Figure 1:
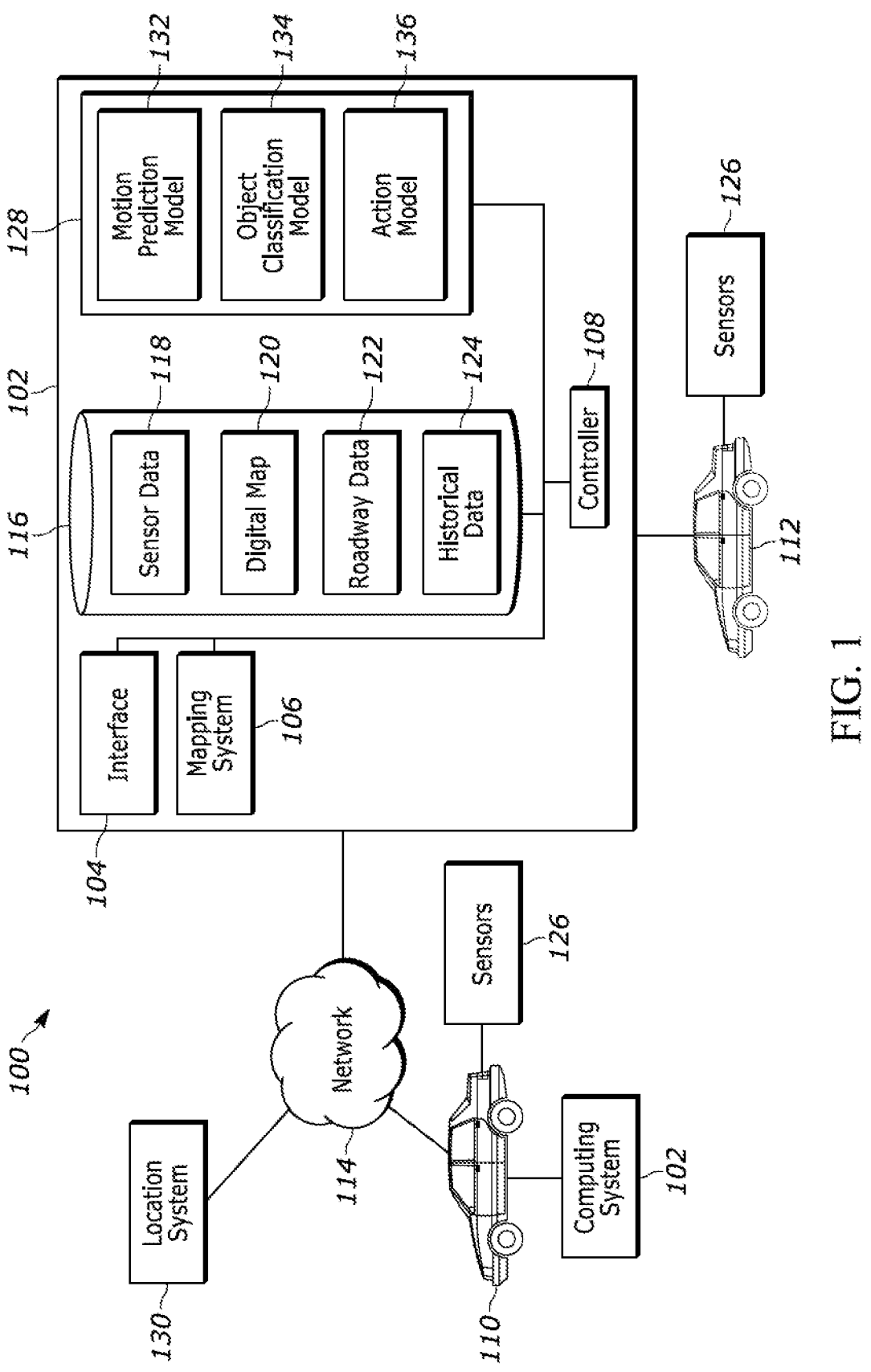
FIG. 1 illustrates a block diagram depicting an example system of the present disclosure, namely an object detection and avoidance communication system, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Some portions of this description describe the embodiments of the disclosure in terms of algorithms and operations. These operations are understood to be implemented by computer programs or equivalent electrical circuits, machine code, or the like, examples of which are disclosed herein. Furthermore, these arrangements of operations may be referred to as modules or units, without loss of generality. The described operations and their associated modules or units may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

References herein are made to roadway conditions or objects in the road. Roadway conditions is intended to mean detected conditions that impact the drivability of the roadway. Examples of roadway conditions include the presence of water on the road, the presence of ice on the road, the presence of potholes in the road, the degradation of lane markers, and the like. Roadway conditions can also refer to the presence of an object on the road. Objects on the road can include debris, broken car parts, a stopped car, an animal, foliage, paper and plastic trash, pieces of glass, and the like. Unless otherwise stated, references to an object on the roadway can also refer to roadway conditions, and vice versa.

It is nearly ubiquitous for modern vehicles to be equipped with a variety of sensors. Whether internal or external to the passenger cabin of the vehicle, these sensors provide the foundation for driving automation and vehicle autonomy. Vehicles with autonomous or semi-autonomous driving or driver-assistant features can use these sensors and associated computer vision technology to safely maneuver the vehicle. These sensors can also help to provide roadway mapping via cloud network communication and information storage. For example, a cloud server can receive sensor data from many vehicles traveling on a roadway, and create a map of that roadway based on the received sensor data.

However, current image recognition systems on vehicles can have difficult in properly or accurately classifying detected roadway conditions. For example, the sensors and associated image recognition systems may infer an object is on the road directly in front of the vehicle. This may cause audible or visual alarms for the driver, or may cause an automatic control of the vehicle (e.g., braking, steering) to avoid the object. If the detected object ends up being a piece of paper that would have caused no harm to the vehicle, the actions taken by the vehicle to avoid the object were unnecessary. Precision in the classifying of the detected object or road condition is key for these actions to only occur if necessary.

Therefore, according to various embodiments described herein, a first vehicle that detects roadway conditions or an object or other roadway condition can leverage wireless communication (e.g., vehicle-to-cloud (V2C) or vehicle-to-vehicle (V2V), vehicle-to-everything (V2X)) to communicate the presence and location of such object or other roadway condition. The first vehicle can also perform fine-grained classification of the object, such as its size, type (e.g., plastic, glass, metal, fabric, rubber, etc.) and the like. This information can be communicated to other vehicles in the vicinity or that are approaching the area in which the detected object or other roadway condition is located. Those vehicles can then preemptively act accordingly, taking action (e.g., slowing down, changing lanes, adjusting suspension, etc.) according to the information provided from the cloud or other vehicle.

FIG. 1 illustrates a block diagram depicting an example system 100 for assisting a driver or vehicle in detecting an object (or roadway conditions) in the roadway, avoiding the object (or roadway conditions), and communicating data relating to the object (or roadway conditions) and the vehicle's maneuvers to other vehicles. This can more generally be referred to as a system 100, or an object detection and avoidance communication system 100. The system 100 can include at least one computing system 102 for use in map generation and updating, processing and/or storing sensor data, and utilizing one or more machine-learning models. The computing system 102 can include at least one interface 104, and at least one mapping system 106 for generating and updating a digital map of the roadway or area that vehicle travels, such as parking lot. The computing system 102 can also include at least one controller 108. The computing system 102 can include hardware or a combination of hardware and software, such as communications buses, circuitry, processors, communications interfaces, among others. The computing system 102 can reside on or within a corresponding vehicle (e.g., a host vehicle). For example, FIG. 1 shows a first vehicle 110 with a computing system 102 on-board, and a second vehicle 112 with another or similar computing system 102 on-board. Alternatively (or in addition), all or part of the computing system 102 can reside on a remote server (e.g., the cloud) which is communicatively coupled to the vehicles 110, 112 via a network 114. Each of the first vehicle 110 and the second vehicle 112 (or their corresponding computing system 102) can be communicatively connected to the network 114 to each other (e.g., via vehicle-to-vehicle (V2V) communication), to the cloud (e.g., via vehicle-to-cloud (V2C) communication), and/or to one or more other systems (e.g., a global positioning system (GPS), or to one or more communications devices). For example, the vehicles may include one or more transceivers configured to establish a secure communication channel with another vehicle or the remote server wirelessly using one or more communication protocols, such as, for example, communication protocol based on vehicle-to-vehicle (V2V) communications, wireless local area network (WLAN) or wireless fidelity (WiFi, e.g., any variant of IEEE 802.11 including 802.11a/b/g/n), wireless personal area network (WPAN, e.g., Bluetooth, Zigbee), cellular (e.g., LTE, 3G/4G/5G, etc.), wireless metropolitan area network WIMAN (e.g., WiMax), and other wide area network, WAN technologies (e.g., iBurst, Flash-OFDM, EV-DO, HSPA, RTT, EDGE, GPRS), dedicated short range communications (DSRC), near field communication (NFC), and the like. This enables the exchange of information and data that is described herein.

The computing system 102 can also include at least one data repository or storage 116. The data repository 116 can include or store sensor data 118 (originating from the sensors described herein), a digital map or digital map data 120, and historical data 124. The sensor data 118 can include information about available sensors, identifying information for the sensors, address information, internet protocol information, unique identifiers, data format, protocol used to communicate with the sensors, or a mapping of information type to sensor type or identifier. The sensor data 118 can further include or store information collected by vehicle sensors 126. The sensor data 118 can store sensor data using timestamps and date stamps. The sensor data 118 can store sensor data using location stamps. The sensor data 118 can categorize the sensor data based on a classification or characteristics of a detected object or roadway conditions, or characteristics thereof.

Vehicle sensors 126 that generate the sensor data 118 can include one or more sensing elements or transducers that captures, acquires, records or converts information about its host vehicle or the host vehicle's environment into a form for processing. As examples, the sensor 126 can be or include an image sensor such as a photographic sensor (e.g., camera), radar sensor, ultrasonic sensor, millimeter wave sensor, infra-red sensor, ultra-violet sensor, light detection sensor, lidar sensor, or the like. The sensor 126 can communicate sensed data, images or recording to the computing system 102 for processing, which can include filtering, noise reduction, image enhancement, etc., followed by object recognition, feature detection, segmentation processes, and the like. The raw data originating from the sensors 126 as well as the processed data by the computing system 102 can be referred to as sensor data 118 or image data that is sensed by an associated sensor 126. In embodiments, the vehicle sensors 126 can acquire or detect information about the roadway, such as objects on the roadway or roadway conditions These objects may include debris, such as construction debris, broken car parts, foliage, paper or plastic trash, glass pieces, a tire, clothing, food, or the like. Roadway conditions can also include potholes, ice, water, snow, or the like that would impact drivability.

The sensor 126 can also include or be in communication with a global positioning system (GPS) device that can determine a location of the host vehicle relative to an intersection, using map data with an indication of the roadway. The GPS device can communicate with location system 130, described further below. The computing system 102 can use the GPS device and the map data to determine that the host vehicle (e.g., first vehicle 110) is located at a particular location of a roadway when the object is detected and/or classified. The sensor 126 can also detect (e.g., using motion sensing, imaging or any of the other sensing capabilities described herein) whether any other vehicle or object is present at or approaching the parking zone, and can track any such vehicle or object's position or movement over time for instance. The sensor 126 can also detect the relative position between the vehicle and the detected object.

Using any one or more of the aforementioned types of sensors 126, the vehicle (e.g., first vehicle 110) is able to virtually map the roadway. For example, the sensors 126 calculate relatives distances between detected objects and the sensor itself, and the computing system 102 can utilize a visual simultaneous localization and mapping (SLAM) system. Visual SLAM is a position detecting scheme in which a process of generating a digital map of an environment (such as a roadway or parking lot) and a process of acquiring a location of the sensor or vehicle itself are complementarily performed. In other words, characteristics of the environment about the vehicle as well as the location of the vehicle itself are determined simultaneously.

The mapping system 106 can implement visual SLAM (or similar technologies) to generate a digital map of the roadway or parking zone. The mapping system 106 is designed, constructed or operational to generate digital map data based on the data sensed by the one or more sensors 126. The digital map data structure (or referred to as digital map 120) can generate the digital map from, with or using one or more machine learning models or neural networks established, maintained, tuned, or otherwise provided via one or more machine learning models 128. The machine learning models 128 can be configured, stored, or established on the computing system 102 of the first vehicle 110, or on a remote server. The mapping system 106 can detect, from a first neural network and based on the data sensed by the one or more sensors 126, objects located on the roadway or roadway conditions. The mapping system 106 can perform, using the first neural network and based on the data sensed by the one or more sensors 126, scene segmentation. The mapping system 106 can determine, using the first neural network and based on the data sensed by the one or more sensors 126, depth information for the roadway. The mapping system 106 can identify, from the first neural network and based on the data sensed by the one or more sensors 126, one or more lane lines in the roadway or parking spots in the parking zone. The mapping system 106 can construct the digital map based on the detected objects located in the roadway or roadway conditions, the scene segmentation, the depth information, and the one or more lane lines or parking spots. The mapping system 106 can also rely on pre-stored map data (e.g., from GOOGLE MAPS or the like) to fuse with the information sensed from the vehicle sensors 126 in creating the virtual map.

The mapping system 106 can create the digital map 120 based on the sensor data 118. This digital map 120 can be created via implemented visual SLAM, as described above. In one embodiment, the digital map 120 can include three dimensions on an x-y-z coordinate plate, and associated dimensions can include latitude, longitude, and range, for example. The digital map 120 can be updated periodically or reflect or indicate a motion, movement or change in one or more objects detected on the road. For example, the digital map can include stationary objects associated with the scene, such as a curb, tree, lines, parking signs, or buildings, as well as non-stationary objects such as vehicles moving or a person moving (e.g., walking, biking, or running). The presence and location of the detected objects in the roadway (e.g., debris) can be included in the digital map.

Various types of machine learning models 128 are disclosed herein. The machine learning model utilized by the mapping system 106 to generate the digital map 120 can include any type of neural network, including, for example, a convolution neural network, deep convolution network, a feed forward neural network, a deep feed forward neural network, a radial basis function neural network, a Kohonen self-organizing neural network, a recurrent neural network, a modular neural network, a long/short term memory neural network, or the like. Each machine learning model 128 can maintain, manage, store, update, tune, or configure one or more neural networks and can use different parameters, weights, training sets, or configurations for each of the neural networks to allow the neural networks to efficiently and accurately process a type of input and generate a type of output.

One or more of the disclosed machine learning models 128 disclosed herein can be configured as or include a convolution neural network. The convolution neural network (CNN) can include one or more convolution cells (or pooling layers) and kernels, that can each serve a different purpose. The convolution kernel can process input data, and the pooling layers can simplify the data, using, for example, non-linear functions such as a max, thereby reducing unnecessary features. The CNN can facilitate image recognition. For example, the sensed input data can be passed to convolution layers that form a funnel, compressing detected features. The first layer can detect first characteristics, the second layer can detect second characteristics, and so on.

The convolution neural network can be a type of deep, feed-forward artificial neural network configured to analyze visual imagery. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other image classification algorithms, the convolution neural network can automatically learn the filters that may be hand-engineered for other image classification algorithms, thereby improving the efficiency associated with configuring, establishing or setting up the neural network, thereby providing a technical advantage relative to other image classification techniques.

One or more of the disclosed machine learning models 128 disclosed herein can include a CNN having an input layer and an output layer, and one or more hidden layers that can include convolution layers, pooling layers, fully connected layers, or normalization layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer. The fully connected layers can connect every neuron in one layer to every neuron in another layer.

To assist in generating the digital map 120, the computing system 102 can interface or communicate with a location system 130 via network 114. The location system 130 can determine and communicate the location of one or more of the vehicles 110, 112 during the performance of the SLAM or similar mapping techniques executed in generating the digital map 120. The location system 130 can include any device based on a positioning system such as Global Navigation Satellite System (GNSS), which can include GPS, GLONASS, Galileo, Beidou and/or other regional systems. The location system 130 can include one or more cellular towers to provide triangulation. The location system 130 can include wireless beacons, such as near field communication beacons, short-range wireless beacons (e.g., Bluetooth beacons), or Wi-Fi modules.

The computing system 102 can be configured to utilize interface 104 to receive and transmit information. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors 126 to collect or receive information, e.g., image data. The interface 104 can be designed, constructed or operational to communicate with the controller 108 to provide commands or instructions to control a vehicle, such as the first vehicle 110. The information collected from the one or more sensors can be stored as shown by sensor data 118.

The interface 104 can receive the image data sensed by the one or more sensors 126 regarding an environment or characteristics of a roadway or parking zone. The sensed data received from the sensors 126 can include data detected, obtained, sensed, collected, or otherwise identified by the sensors 126. As explained above, the sensors 126 can be one or more various types of sensors, and therefore the data received by the interface 104 for processing can be data from a camera, data from an infrared camera, lidar data, laser-based sensor data, radar data, transducer data, or ultrasonic sensor data. Because this data can, when processed, enable information about the roadway or parking zone to be visualized, this data can be referred to as image data.

The data sensed from the sensors 126 can be received by interface 104 and delivered to mapping system 106 for detecting various qualities or characteristics of the roadway as explained above utilizing techniques such as segmentation, CNNs, or other machine learning models. For example, the mapping system 106 can rely on one or more neural networks or machine learning models 128 to detect objects or roadway conditions, scene segmentation, roads, terrain, trees, curbs, obstacles, depth or range of the parking lot, debris, lane line detection, parking marker detection, parking signs, or roadway signs. The computing system 102 can train the machine learning models 128 using historical data 124. This training can be performed remote from a computing system 102 installed on a vehicle 110, 112. In other words, the computing system 102 may be on a remote server for at least these purposes. Once trained, the models can be communicated to or loaded onto the vehicles 110, 112 via network 114 for execution.

Once generated, the digital map 120 can be stored in storage 116 and accessed by other vehicles. For example, the computing system 102 of a first vehicle 110 may be utilized to at least in part generate the digital map 120 of a portion of a roadway, whereupon that digital map 120 can be accessed by the computing system 102 of a second vehicle 112 that subsequently drives over or near the same roadway. The computing system 102 of the second vehicle 112 (and other vehicles) can be utilized to update the digital map 120 in real-time based upon more reliable data captured form the second vehicle 112. In addition, the computing system 102 of both vehicles 110, 112 can be used to generate and continuously update roadway data 122 in real-time. The roadway data 122 represents data indicating characteristics of the roadway, including, for example, the presence, location, and class of the detected object. For example, the roadway data 122 can include a location of one or more of the detected objects, the class of the detected object (e.g., whether the object is debris or a pothole), and the sub-class or granular information of the detected object (e.g., what type of debris (e.g., food, plastic, paper), the size of the pothole). These qualities of the roadway can be determined via the image data received from sensors 126 either when the digital map is generated, and/or when the digital map is updated by a second vehicle 112 or other vehicles. By updating the roadway data 122 in real-time, a subsequent vehicle that enters a particular area of the roadway can be provided with live, accurate information about, for example, objects detected by another vehicle that previously traveled on that same roadway.

As described above, one or more machine learning models 128 can be relied upon to perform the various functions described herein. These machine learning models 128 can include a motion prediction model 132, an object classification model 134, an action model 136, and other models. The motion prediction model 132 is further described with reference to FIG. 3. It is trained and configured to receive the image data 118 (or encoded or processed image data), along with the vehicle dynamics (e.g., GPS, mapping data), and output a predicted motion of the detected object. For example, the detected object could be a dynamic object such as debris that moves as cars pass over it or the wind blows it. The motion prediction model 132 is configured to detect such motion and predict subsequent motion of the object based on its previous motion. This can include trajectory analysis, for example, based on the previous trajectory of that object. The motion prediction model 132 can rely on data from other vehicles that have previously traveled over the roadway where the object is located. This allows image data from a plurality of vehicles to be combined to estimate the future trajectory of the object. The motion prediction model 132 can also, based on the above data, analyze the level of threat the detected object is to the vehicle. For example, a small piece of plastic such as a plastic bag on the roadway may pose a low risk to the vehicle, and thus no action is taken and the vehicle can safely travel over the object. In contrast, a larger piece of trash such as a garbage can could pose a significant risk to the vehicle, and thus an appropriate action such as swerving to avoid the object may take place.

The object classification model 134 is also further described with reference to FIG. 3. It is trained and configured to, based on the image data, perform image classification (e.g., segmentation) to determine information about the detected object (e.g., multiple layers or granularities about the object), and generate and update the roadway data with this information. For example, the object classification model 134 can be a machine learning model that determines not only the presence of an object or roadway condition, but also the type of object or roadway condition, its size, relative orientation, and the like. In the example of the detected object being debris, the type of debris is also determined by the object classification model 134. This can include, for example, whether the debris is construction debris, plastic, or the other examples explained herein. This granular detail can enable the vehicle and its action model 136 to take appropriate action based on the detailed information about the object, as will be described below.

The action model 136 is also further described with reference to FIG. 3. It is trained and configured to command or take an appropriate action, such as slow the vehicle down, move the vehicle to the side, or assume a new vehicle trajectory to avoid the object. The output of the action model 136 can be based on the threat analysis output by the motion prediction model 132 and the object classification model 134, as well as the vehicle's own location or map data. For example, if the detected object is a small pothole that is only a couple of inches wide, the threat analysis might yield a low score indicating a low level of risk. This can cause the vehicle to take zero to limited action, such as slightly slowing down but maintaining the same trajectory. In contrast, if the detected object is a large pothole (e.g., over a foot wide), the level of risk may be higher and the action model can command more severe actions such as swerving, assuming a new trajectory, or adjusting the vehicle's suspension. Of course, the location of other vehicles on the roadway would be considered by the action model so that the commanded action poses no safety concerns to other vehicles on the roadway.

Figure 2:
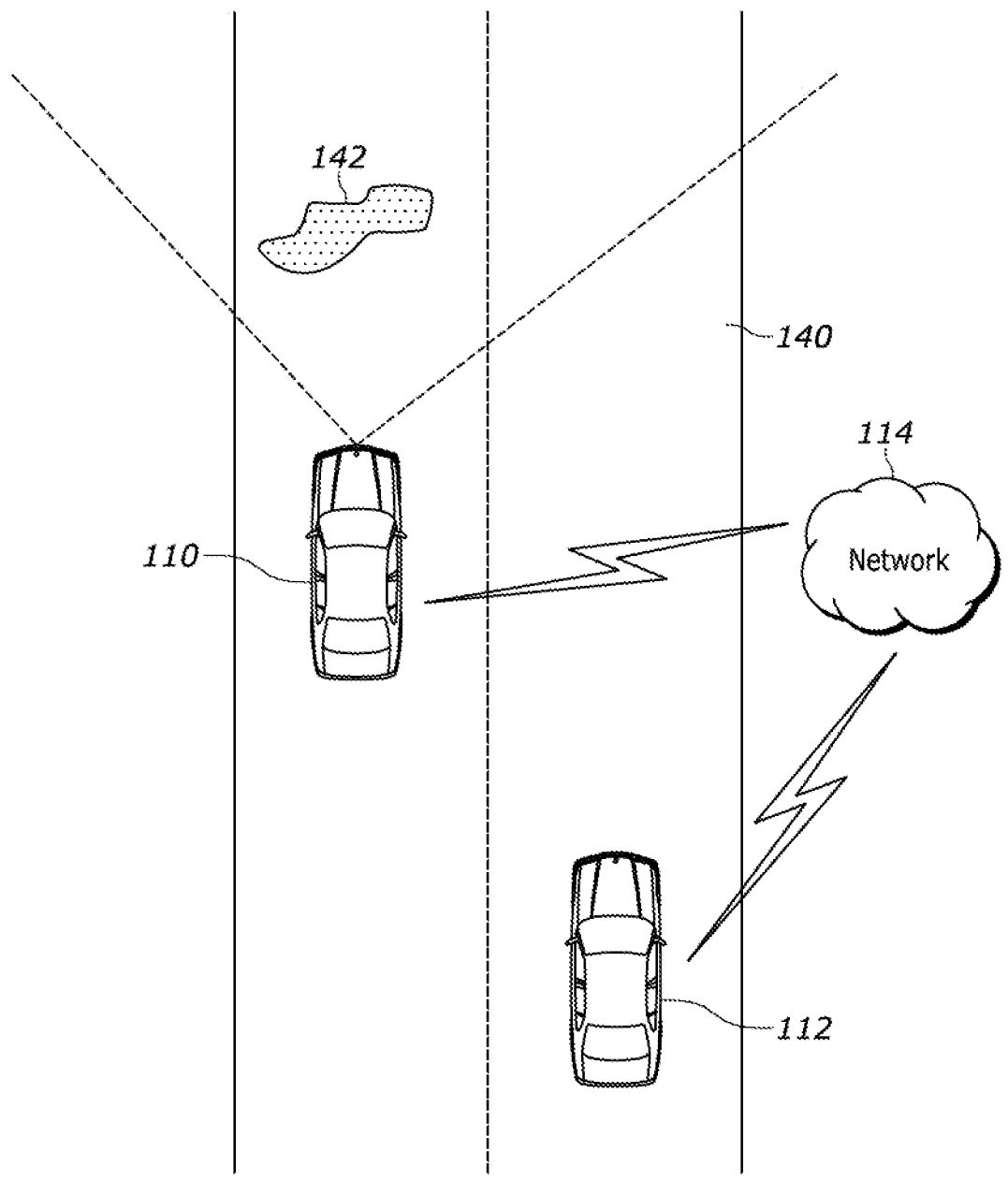
FIG. 2 illustrates an overhead schematic implementing the system of FIG. 1, according to an embodiment.

As explained above, various machine learning models 128 can rely on data from other vehicles (e.g., first vehicle 110) that have already traveled on the roadway. This is illustrated in FIG. 2 as an example. Here, the first vehicle 110 is located on the roadway 140 ahead of the second vehicle 112. The first vehicle 110 can detect the location of an object 142 on the roadway 140. The computing system 102 of the first vehicle 110 can classify this object using the object classification model 134. Alternatively, the first vehicle 110 can share the image data to the cloud via network 114 such that the computing system 102 of an off-board server can perform the object classification. This information can be shared with the second vehicle 112 via network 114 prior to the second vehicle 112 even detecting the object 142 for itself. The action model 136 for the second vehicle 112 can command a the second vehicle 112 to take appropriate action well in advance of even detecting the object for itself. For example, the second vehicle 112 may take a new trajectory and/or change lanes on the roadway based on the information obtained by the first vehicle 110 regarding the detected object 142.

In one embodiment, the first vehicle 110 can be an unmanned vehicle such as a drone. The drone can capture image data of the roadway where it may be unsafe to drive a vehicle. For example, in the event of a natural disaster, extremely icy road conditions, or other poor conditions, a drone can travel by air to capture image data of the roadway according to the teachings described herein. The data captured can be sent to the computing system 102 for processing and/or sent to another vehicle (e.g., second vehicle 112) before that vehicle travels along the roadway.

Figure 3:
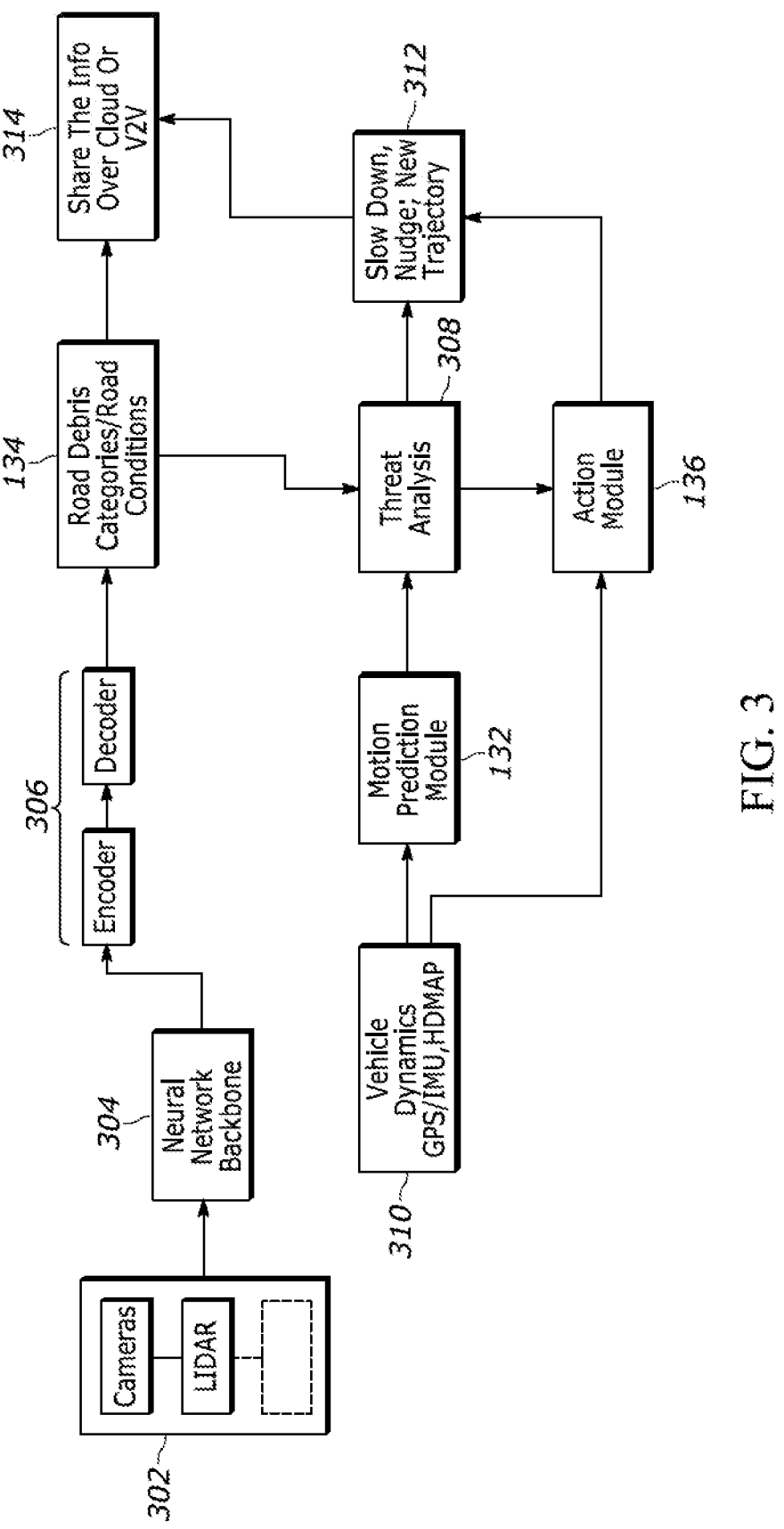
FIG. 3 illustrates an example operational diagram for implementing the system of FIG. 1, according to an embodiment.

FIG. 3 illustrates an example operational diagram for implementing the system of FIG. 1. The various operations illustrated here can be performed by one or more system, component, or function depicted in FIG. 1. For example, the operations can be performed by computing system 102, mapping system 106, controller 108, and the various machine learning models 128 disclosed above. At 302, the computing system can receive, identify or collect sensor data sensed by one or more sensors, such as those described above (e.g., camera, lidar, ultrasonic, etc.). The computing system can collect the data in a raw format or preprocessed format. In some cases, the computing system can collect the data responsive to a request to collect data. For example, the computing system can collect the data in response to a location of the vehicle entering or becoming closer a particular stretch of roadway, an input from the driver indicating a desire to learn about the roadway, or the like.

At 304, the sensor data is input into a neural network backbone. In addition to image classification described herein, more complicated CNN architectures can solve different computer vision tasks, such as object detection or segmentation. To do so, a neural network backbone can be used as the feature-extracting network that processes the image data into a certain feature representation. These feature extraction networks typically perform well as stand-alone networks on simpler tasks, and therefore, they can be utilized for a feature-extracting part in the more complicated models, such as the fine-grained classification of the object described above. In one embodiment, the neural network backbone can be ResNet. In another embodiment, the neural network backbone can be YOLO or YOLO v2. DarkNet or other deep neural network (DNN) can be used as well. A proper backbone to utilize can be searched for via, for example, a Neural Architecture Search (NAS).

A 306, an encoder-decoder model is utilized. The encoder-decoder model can be used in parallel with the neural network backbone, or alternative to the backbone.

The decoded data from the encoder decoder 306 is sent to an object classification model 134. As described above, the object classification model is configured to categorize the detected road debris or detected road condition. Not only is a general label placed on the detected object (e.g., "debris" or "ice"), but specific information about that detected object is also determined. This includes the object's size, depth, height, light reflectiveness, and the like. This helps the object classification model 134 determine fine-grained detail about the object to differentiate various items, such as the debris being a plastic bag versus a glass bottle, or a piece of clothing versus an anvil. The object classification model 134 can yield a general class of the object (e.g., "debris"), as well as a fine-grained class of the object (e.g., "bag"). Additional layers of fine-grained details can be provided (e.g., "plastic bag"). A hierarchy or layered structure of details of the object can be produced by the object classification model 134.

Depending on the fine-grained detail about the object as determined by the object classification model 134, a threat analysis is performed at 308. The threat analysis may output a score corresponding to the potential risk or danger of the detected object to the vehicle. For example, if the detected object is determined to be an apple, the threat analysis may yield a relatively low risk score. However, if the detected object is determined to be a bowling ball, the threat analysis may yield a relatively high risk score.

The threat analysis at 308 can also be performed based on the output of the motion prediction model 132. The motion prediction model 132 is configured to determine the movement characteristics of the detected object and estimate a trajectory or predict future movement of the object. A simple example is of a ball rolling across a street; the motion prediction model 132 can predict the ball's path of travel based on its previous path taken. The motion prediction model 132 can also receive data regarding the vehicle dynamics 310, such as the location of the vehicle (e.g., GPS), the movement characteristics of the vehicle (e.g., inertial measurement units, IMUs), and/or the map data (e.g., digital map 120) of the environment about the vehicle. This can directly impact the threat analysis 308. For example, if the predicted movement of the object on the roadway intersects with the vehicle's current trajectory, and if the detected object is dangerous if contacting the vehicle, then the risk score output by the threat analysis can be extremely high. If the predicted movement of the object on the roadway does not intersect the vehicle's current trajectory, the risk score output by the threat analysis can be reduced. Likewise, if the category of the detected object is not dangerous (e.g., if the object is a paper bag), then the risk score output by the threat analysis can be reduced. In short, the risk score determined by the threat analysis can be based on the output of the motion prediction model 132, the object classification model 134, and the vehicle dynamics.

The determined risk score directly impacts how the action model 136 performs. Based on the degree of risk output by the threat analysis performed at 308, the action model 136 may command different actions to be performed at 312. For example, if the degree of risk is relatively high, the action model 136 may command the vehicle to swerve, travel in a different lane, apply brakes, accelerate, or the like. If the degree of risk is moderate, the action model 136 may nudge the driver, such as providing haptic feedback to the driver by vibrating the steering wheel or flashing a warning light. If the degree of risk is relatively low, the action model 136 may command no action to be taken, or may merely audibly or visually inform the driver of the object's presence, along with accompanying information about the object as determined from the object classification model 134.

The vehicle may be a semi-autonomous vehicle or fully-autonomous vehicle. Therefore, the action model 136 may simply control the vehicle automatically to avoid contacting the object—or continue along the current path to contact the object-based on the threat analysis. This decision can also be based on the presence and location of other vehicles in the vicinity.

At 314, much or all of the information described with respect to FIG. 3 can be shared over the cloud, or via V2V communication or other network 114, to other vehicles. This can help the other vehicles that will soon travel that roadway to make informed decisions well in advance of becoming near the object, as explained with reference to FIG. 2. The fine-grained classification of the object can be shared from one vehicle to another. Additionally, the action taken by the vehicle (e.g., first vehicle 110) as determined by the action model 136 can be shared with a second vehicle (e.g., second vehicle 112, which may be trailing, adjacent, or nearby the first vehicle 110), along with an indication of whether that action was sufficient. For example, the action taken can be an adjustment of the vehicle's suspension or braking in response to the detected object being an icy roadway condition, and if that action sufficiently maintained control of the vehicle over the ice, the trailing vehicle can learn and perform the same action. Alternatively, if the action taken was not sufficient (e.g., the vehicle slipped when traveling over the ice), the trailing vehicle can also learn from this information and attempt another action such as applying more brakes, or moving into a different lane on the roadway.

The sharing of information at 314 can also be beneficial for dispatching an appropriate person or vehicle to the area of the roadway to remove the debris or improve the roadway conditions. For example, if the object classification model 134 determines the road conditions are icy, a notification can be sent via network 114 to a salt truck controlling entity which can issue appropriate commands to dispatch a salt truck to the roadway. In another embodiment, if the object classification model 134 determines the detected object is a stalled vehicle, a notification can be sent via network 114 to the police so that a police car can be dispatched to the scene.

Figure 4:
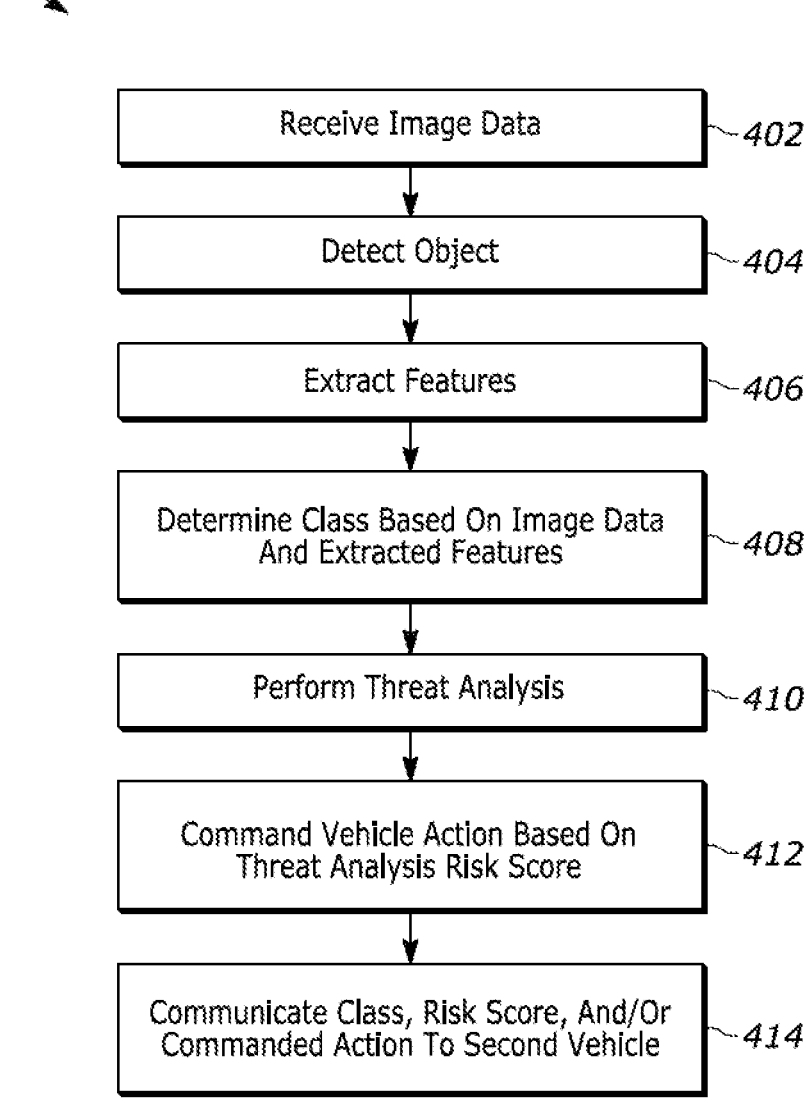
FIG. 4 illustrates a method of implementing the system of FIG. 1, according to an embodiment.

FIG. 4 illustrates a method 400 of implementing the system of claim 1, according to an embodiment. The various steps herein can be performed via the computing system 102. In some embodiments, parts of the computing system 102 are on-board the vehicle, and other parts of the computing system 102 are located in either another vehicle or in the cloud, e.g., a remote server. At 402, the computing system 102 receives image data. The image data can be captured via sensors 126 such as cameras, for example. At 404, the computing system 102 detects an object in the image data. This can be performed via, for example, via a neural network backbone such as described at 304.

At 406, the computing system 102 extracts features from the image data corresponding to the detected object. This can also be performed via the neural network backbone or other models described herein. The feature extraction in the neural network contains the representations that are learned by the previous network to extract the interesting, of-value features from the new image data. The features extracted from the image data relating to the detected object can include parts or patterns of the object that help identify it, such as, for example, the object's color, size, depth, light reflectivity, sides, corners, and the like.

At 408, the computing system 102 performs object classification based on the image data and the extracted features. This can be performed via the object classification model 134 described herein, for example. The output of the object classification may include a label and/or bounding box placed about the object identifying the estimated class of the object. This can include course-grained classifications, for example, a label such as debris, person, vehicle, building, animal, and the like. This object classification can also output more fine-grained classification information, such as the type of debris (e.g., glass, plastic, food), the type of vehicle (e.g., car, truck, van), the type of animal (e.g., dog, bird, squirrel), and the like.

At 410, the computing system 102 performs a threat analysis, such as described at 308 above. The threat analysis may output a score corresponding to the potential risk or danger of the detected object to the vehicle. Some objects can be of a far less threat to the vehicle than other objects, as described above. As a simple example, a piece of paper on the road can cause the threat analysis to output a low risk score, while a piece of sheet metal on the road can cause the threat analysis to output a moderate or high risk score. The identification of the object being either paper or sheet metal can be based on the object classification which outputs a coarse-grained (e.g., "debris") and fine-grained (e.g., "paper" or "metal") class information.

At 412, the computing system 102 commands the vehicle to take an action based on the threat analysis risk score. As explained above, if the risk is low, the commanded action may be nothing, or may be a simple warning to the driver. If the risk is moderate, a more aggressive warning can be provided to the driver, or haptic feedback can be provided to the driver, or the vehicle can be automatically moved out of the way of the object. If the risk is high, the vehicle can brake, swerve, or the like. These actions can be customized, or can be learned via machine learning based upon a desired outcome and whether the action taken was adequate.

At 414, the computing system 102 communicates to another computing system (e.g., of a trailing vehicle) the presence of the object on the roadway, the class of the object, the computing risk score, and/or the commanded action taken by the vehicle at 412. This can aid the trailing vehicle to take appropriate action prior to arriving at the object in the roadway.

Figure 5:
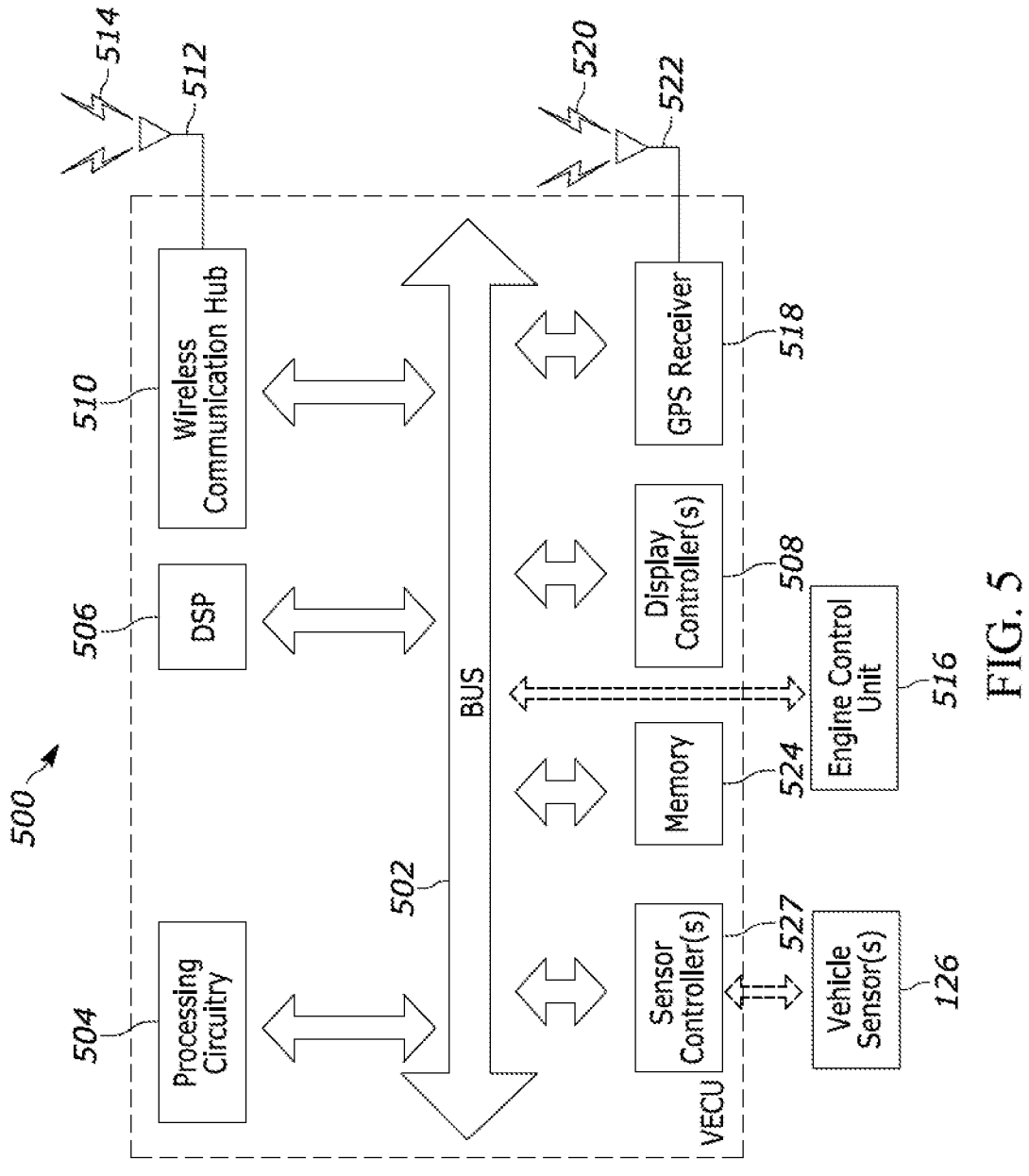
FIG. 5 illustrates a block diagram of a vehicle electronics control system, according to an exemplary embodiment of the present disclosure.

FIG. 5 is a block diagram of internal components of an exemplary embodiment of a computing system 500. The computing system 500 may include or be used to implement the computing systems described above. In this embodiment, the computing system 500 may be embodied at least in part in a vehicle electronics control unit (VECU). It should be noted that FIG. 5 is meant only to provide a generalized illustration of various components, any or all of which may be utilized as appropriate. It can be noted that, in some instances, components illustrated by FIG. 5 can be localized to a single physical device and/or distributed among various networked devices, which may be disposed at different physical locations.

The computing system 500 has hardware elements that can be electrically coupled via a BUS 502. The hardware elements may include processing circuitry 504 which can include, without limitation, one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform the operations disclosed herein, including, among others, image processing, data processing, and implementation of the machine learning models described above. Some embodiments may have a separate DSP 506, depending on desired functionality. The computing system 500 can also include one or more display controllers 508, which can control the display devices disclosed above, such as an in-vehicle touch screen, screen of a mobile device, and/or the like.

The computing system 500 may also include a wireless communication hub 510, or connectivity hub, which can include a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 510 can permit data to be exchanged with network 114, wireless access points, other computing systems, etc. The communication can be carried out via one or more wireless communication antenna 512 that send and/or receive wireless signals 514.

The computing system 500 can also include or be configured to communicate with an engine control unit 516, or other type of controller 108 described herein. In the case of a vehicle that does not include an internal combustion engine, the engine control unit may instead be a battery control unit or electric drive control unit configured to command propulsion of the vehicle. In response to instructions received via the wireless communications hub 510, the engine control unit 516 can be operated in order to control the movement of the vehicle during, for example, a parking procedure.

The computing system 500 also includes vehicle sensors 126 such as those described above with reference to FIG. 1. These sensors can include, without limitation, one or more accelerometer(s), gyroscope(s), camera(s), radar(s), LiDAR (s), odometric sensor(s), and ultrasonic sensor(s), as well as magnetometer(s), altimeter(s), microphone(s), proximity sensor(s), light sensor(s), and the like. These sensors can be controlled via associated sensor controller(s) 527.

The computing system 500 may also include a GPS receiver 518 capable of receiving signals 520 from one or more GPS satellites using a GPS antenna 522. The GPS receiver 518 can extract a position of the device, using conventional techniques, from satellites of an GPS system, such as a global navigation satellite system (GNSS) (e.g., Global Positioning System (GPS)), Galileo, GLONASS, Compass, Galileo, Beidou and/or other regional systems and/or the like.

The computing system 500 can also include or be in communication with a memory 524. The memory 524 can include, without limitation, local and/or network accessible storage, a disk drive, a drive array, an optical storage device, a solid-state storage device, such as a RAM which can be programmable, flash-updateable and/or the like. Such storage devices may be configured to implement any appropriate data stores, including without limitation, various file systems, database structures, and/or the like. The memory 524 can also include software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These memory devices may be non-transitory computer-readable storage mediums for storing computer-executable instructions which, when executed by one or more processors described herein, can cause the one or more processors to perform the techniques described herein. The processor and the memory can be supplemented by, or incorporated in, special purpose logic circuitry.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An object avoidance communication computing system comprising:

a first image sensor mounted to a first vehicle and configured to generate first image data;

one or more processors programmed to execute instructions stored on memory that cause the one or more processors to perform:

receiving the first image data, wherein the first image data corresponds to a roadway that the first vehicle is traveling on;

utilizing a neural network backbone to detect an object on the roadway based on the first image data and perform feature extraction on the first image data to extract relevant features of the object;

executing an object classification model based on the first image data and the relevant features to hierarchically determine a class of the object, wherein hierarchically determining the class of the object includes producing a hierarchical structure of classification by: (i) determining a general class of the object, and (ii) determining, based on the determined general class, a fine-grained class of the object within the general class, wherein the general class of the object is debris, and the fine-grained class of the object is a type of debris;

performing a threat analysis based, on as separate inputs, the determined general class of the object and the determined fine-grained class of the object to determine a risk score based on a combination of the separate inputs;

commanding an action to be taken by the first vehicle, wherein the commanded action varies depending on the risk score; and communicating wirelessly, to a second vehicle on the roadway, (i) the determined class of the object, (ii) the risk score, (iii) the commanded action taken by the first vehicle, and (iv) an indication of whether the commanded action was sufficient.

2. The object avoidance communication computing system of claim 1, wherein the class of the object determined by the object classification model is a roadway condition, wherein the roadway condition is at least one of a pothole, ice, crack, wet, sandy, or snow.

3. The object avoidance communication computing system of claim 1, wherein the commanded action taken by the first vehicle includes at least one of an application of vehicle brakes, accelerating, altering a trajectory of the first vehicle, and an adjustment of vehicle suspension.

4. The object avoidance communication computing system of claim 1, wherein the one or more processors is further programmed to perform:

executing a motion prediction model based on the first image data to output a predicted motion of the object;

wherein the risk score is determined based upon the predicted motion of the object.

5. The object avoidance communication computing system of claim 1, wherein the one or more processors is further programmed to perform:

commanding a second action to be taken by the second vehicle based upon the determined class of the object, the risk score, and the commanded action taken by the first vehicle.

6. The object avoidance communication computing system of claim 1, wherein the communicating wirelessly includes communicating via a vehicle-to-vehicle (V2V) network.

7. The object avoidance communication computing system of claim 1, wherein the communicating wirelessly includes communicating via a vehicle-to-cloud (V2C) network.

8. A method of avoiding an object in a roadway and communicating associated information with other vehicles, the method comprising:

receiving first image data sensed by a first sensor mounted on a first vehicle, wherein the first image data corresponds to a roadway that the first vehicle is traveling on;

utilizing a neural network backbone to detect an object on the roadway based on the first image data and perform feature extraction on the first image data to extract relevant features of the object;

executing an object classification model based on the first image data and the relevant features to hierarchically determine a class of the object, wherein hierarchically determining the class of the object includes producing a hierarchical structure of classification by: (i) determining a general class of the object, and (ii) determining, based on the determined general class, a fine-grained class of the object within the general class, wherein the general class of the object is debris, and the fine-grained class of the object is a type of debris;

performing a threat analysis based on, as separate inputs, the determined general class of the object and the determined fine-grained class of the object to determine a risk score based on a combination of the separate inputs;

commanding an action to be taken by the first vehicle, wherein the commanded action varies depending on the risk score; and communicating wirelessly, to a second vehicle on the roadway, (i) the determined class of the object, (ii) the risk score, (ii) the commanded action taken by the first vehicle, and (iv) an indication of whether the commanded action was sufficient.

9. The method of claim 8, wherein the class of the object determined by the object classification model is a roadway condition, wherein the roadway condition is at least one of a pothole, ice, crack, wet, sandy, or snow.

10. The method of claim 8, wherein the commanded action taken by the first vehicle includes at least one of an application of vehicle brakes, accelerating, altering a trajectory of the first vehicle, and an adjustment of vehicle suspension.

11. The method of claim 8, further comprising:
executing a motion prediction model based on the first image data to output a predicted motion of the object;
wherein the risk score is determined based upon the predicted motion of the object.

12. The method of claim 8, further comprising:
commanding a second action to be taken by the second vehicle based upon the determined class of the object, the risk score, and the commanded action taken by the first vehicle.

13. The method of claim 8, wherein the communicating wirelessly includes communicating via a vehicle-to-cloud (V2C) network.

14. A non-transitory computer-readable storage medium storing one or more programs, the one or more programs comprising instructions which, when executed by one or more processors of an electronic device, cause the electronic device to perform:

receiving first image data sensed by a first sensor mounted on a first vehicle, wherein the first image data corresponds to a roadway that the first vehicle is traveling on;

detecting an object on the roadway based on the first image data;

utilizing a neural network to perform feature extraction on the first image data to extract relevant features of the object and execute an object classification model based on the first image data and the relevant features to hierarchically determine a class of the object, wherein hierarchically determining the class of the object includes producing a hierarchical structure of classification by: (i) determining a general class of the object, and (ii) determining, based on the determined general class, a fine-grained class of the object within the general class, wherein the general class of the object is debris, and the fine-grained class of the object is a type of debris;

performing a threat analysis based on, as separate inputs, the determined general class of the object and the determined fine-grained class of the object to determine a risk score based on a combination of the separate inputs;

commanding an action to be taken by the first vehicle, wherein the commanded action varies depending on the risk score; and communicating wirelessly, to a second vehicle on the roadway, (i) the determined class of the object, (ii) the risk score, (iii) the commanded action taken by the first vehicle, and (iv) an indication of whether the commanded action was sufficient.

* * * * *